US007698891B2

(12) United States Patent
Haramoto et al.

(10) Patent No.: US 7,698,891 B2
(45) Date of Patent: Apr. 20, 2010

(54) TRAVEL MOTION CONTROL APPARATUS FOR HYDRAULICALLY DRIVEN VEHICLE, HYDRAULICALLY DRIVEN VEHICLE AND WHEEL HYDRAULIC EXCAVATOR

(75) Inventors: Hideki Haramoto, Tsuchiura (JP); Hidetoshi Satake, Ichioka (JP); Yukihiro Tatsuno, Tsukuba (JP); Kazuhiro Ichimura, Niihari (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 291 days.

(21) Appl. No.: 11/889,426

(22) Filed: Aug. 13, 2007

(65) Prior Publication Data

US 2007/0289639 A1 Dec. 20, 2007

Related U.S. Application Data

(63) Continuation of application No. 10/512,146, filed as application No. PCT/JP03/04634 on Apr. 11, 2003, now abandoned.

(30) Foreign Application Priority Data

Apr. 26, 2002 (JP) ............................. 2002-126313

(51) Int. Cl.
*F16D 31/02* (2006.01)
*F16D 39/00* (2006.01)
(52) U.S. Cl. ............................. 60/448; 60/468; 60/493
(58) Field of Classification Search .................. 60/448, 60/451, 452, 468, 493
See application file for complete search history.

(56) References Cited

U.S. PATENT DOCUMENTS

| 3,864,910 | A | 2/1975 | Mechin |
| 4,481,769 | A | 11/1984 | Nagahara |
| 5,435,131 | A | 7/1995 | Hausman et al. |
| 6,321,867 | B1 | 11/2001 | Kowalyk |
| 6,339,929 | B1 | 1/2002 | Udagawa et al. |

FOREIGN PATENT DOCUMENTS

| DE | 19 31 533 | 1/1971 |
| DE | 42 12 983 C1 | 5/1993 |
| DE | 42 34 826 C1 | 10/1993 |
| FR | 1123608 | 9/1956 |
| JP | A 1-116371 | 5/1989 |
| JP | A 6-193730 | 7/1994 |
| JP | A 8-270788 | 10/1996 |
| JP | A 2000-74213 | 3/2000 |
| JP | A 2001-304409 | 10/2001 |

*Primary Examiner*—Michael Leslie
(74) *Attorney, Agent, or Firm*—Oliff & Berridge PLC

(57) ABSTRACT

The present invention includes: a hydraulic pump 10 that is driven by a driving motor; a travel motion motor 12 that is driven with pressure oil supplied from the hydraulic pump 10; a travel motion control valve 11 that controls a flow rate of the pressure oil supplied from the hydraulic pump 10 to the travel motion motor 12; a means for operation 22a with which the travel motion control valve 11 is operated; a means for rotation rate detection 95 that detects a rotation rate N of the travel motion motor 12; and a means for motor over rotation prevention 14, 17, 32 that reduces the rotation rate of the travel motion motor 12 if the means for rotation rate detection 95 detects a rotation rate equal to or higher than a predetermined rotation rate upper limit Nmax.

20 Claims, 14 Drawing Sheets (a)

(b)

TRAVEL MOTION CONTROL APPARATUS FOR HYDRAULICALLY DRIVEN VEHICLE, HYDRAULICALLY DRIVEN VEHICLE AND WHEEL HYDRAULIC EXCAVATOR

This is a Continuation of application Ser. No. 10/512,146 filed Oct. 22, 2004, which in turn is a National Stage of PCT/JP03/04634, filed Apr. 11, 2003. The disclosures of the prior applications are hereby incorporated by reference herein in their entirety.

TECHNICAL FIELD

The present invention relates to a travel motion control apparatus for a hydraulically driven vehicle such as a wheel hydraulic excavator, a hydraulically driven vehicle and a wheel hydraulic excavator.

BACKGROUND ART

There are hydraulically driven vehicles such as wheel hydraulic excavators in the known art that are made to travel by controlling with a control valve the flow rate and the direction of pressure oil output from a hydraulic pump that is driven by a driving motor and by driving a travel motion variable displacement hydraulic motor with the controlled pressure oil. The motor speed in this type of vehicle is controlled through the control valve which is switched as the operator steps on the accelerator pedal and also through an adjustment of the displacement volume of the travel motion motor, which is increased as the load pressure of the travel motion motor rises. Japanese Laid Open Patent Publication No. H8-270788, for instance, discloses a travel motion control apparatus for such a hydraulically driven vehicle.

The apparatus disclosed in the publication mentioned above adopts the structure described below. The operating state of a travel motion control valve is detected and also, the switch-over position of a travel motion transmission that can be switched to a high-speed setting or a low-speed setting is detected. Then, if the control valve is detected to be at a neutral position and the transmission is detected to be at the high-speed setting, the displacement volume of the travel motion motor is increased to the maximum displacement volume. As a result, the motor displacement volume increases to the maximum level to achieve a great braking force when the vehicle travels downhill with the control valve at the neutral position without the operator stepping on the accelerator pedal.

However, the apparatus disclosed in the publication does not increase the displacement volume of the travel motion motor and thus, a sufficient level of braking force cannot be achieved if the vehicle is made to travel downhill while the operator is stepping on the pedal. For this reason, the risk of an over rotation of the travel motion motor arises.

DISCLOSURE OF THE INVENTION

The present invention provides a travel motion control apparatus for a hydraulically driven vehicle, a hydraulically driven vehicle and a wheel hydraulic excavator, which are capable of preventing over rotation of a travel motion motor regardless of the position assumed by the travel motion control valve.

A travel motion control apparatus for a hydraulically driven vehicle, according to the present invention, comprises: a hydraulic pump that is driven by a driving motor; a travel motion motor that is driven with pressure oil supplied from the hydraulic pump; a travel motion control valve that controls a flow rate of the pressure oil supplied from the hydraulic pump to the travel motion motor; a means for operation with which the travel motion control valve is operated; a means for rotation rate detection that detects a rotation rate of the travel motion motor; and a means for motor over rotation prevention that reduces the rotation rate of the travel motion motor if the means for rotation rate detection detects a rotation rate equal to or higher than a predetermined rotation rate upper limit.

By adopting the structure described above, the rotation rate of the travel motion motor is reduced when the rotation rate of the travel motion motor is equal to or greater than the rotation rate upper limit and, as a result, over rotation of the travel motion motor is prevented.

A travel motion control apparatus for a hydraulically driven vehicle, according to the present invention, comprises: a hydraulic pump that is driven by a driving motor; a travel motion motor that is driven with pressure oil supplied from the hydraulic pump; a travel motion control valve that controls a flow rate of the pressure oil supplied from the hydraulic pump to the travel motion motor; a means for operation with which the travel motion control valve is operated; a means for rotation rate detection that detects a rotation rate of the travel motion motor; and a means for motor over rotation prevention that increases a displacement volume in the travel motion motor to a level equal to a predetermined value smaller than a maximum displacement volume if the means for rotation rate detection detects a rotation rate equal to or higher than a predetermined rotation rate upper limit which is equal to or less than an allowable rotation rate limit of the travel motion motor.

By adopting the structure described above, the rotation rate of the travel motion motor is reduced when the rotation rate of the travel motion motor is equal to or greater than the rotation rate upper limit and, as a result, over rotation of the travel motion motor is prevented.

Also, a travel motion control apparatus for a hydraulically driven vehicle, according to the present invention, comprises: a hydraulic pump that is driven by a driving motor; a travel motion motor that is driven with pressure oil supplied from the hydraulic pump; a means for motor displacement volume control that controls a displacement volume of the travel motion motor in correspondence to a travel pressure at the travel motion motor; a travel motion control valve that controls a flow rate of the pressure oil supplied from the hydraulic pump to the travel motion motor; a means for operation with which the travel motion control valve is operated; a means for rotation rate detection that detects a rotation rate of the travel motion motor; and a means for motor over rotation prevention that increases the displacement volume of the travel motion motor regardless of motor displacement volume control executed by the means for motor displacement volume control if the means for rotation rate detection detects a rotation rate equal to or higher than a predetermined rotation rate upper limit. The means for motor over rotation prevention stops control for increasing the displacement volume of the travel motion motor once the rotation rate of the travel motion motor becomes equal to or less than a predetermined rotation rate lower limit which is at least lower than the rotation rate upper limit, and the displacement volume of the travel motion motor is controlled by the means for motor displacement volume control in correspondence to the traveling pressure.

Moreover, a travel motion control apparatus for a hydraulically driven vehicle, according to the present invention, comprises: a hydraulic pump that is driven by a driving motor and outputs hydraulic operating oil inside a tank; a travel motion motor that is driven with pressure oil supplied from the hydraulic pump; a travel motion control valve that controls a flow rate of the pressure oil supplied from the hydraulic pump to the travel motion motor and includes a pressure oil supply port through which the pressure oil is supplied to the travel motion motor and a return port through which the pressure oil returns to the tank; a counterbalance valve disposed between the travel motion motor and the travel motion control valve, which is controlled by a travel pressure output from the hydraulic pump; a means for operation with which the travel motion control valve is operated; a means for rotation rate detection that detects a rotation rate of the travel motion motor; and a means for motor over rotation prevention that reduces a rotation rate of the travel motion motor if the means for rotation rate detection detects a rotation rate equal to or higher than a predetermined rotation rate upper limit.

It is preferred that the travel motion motor is a variable displacement travel motion motor, and a displacement volume of the travel motion motor is increased to a predetermined value smaller than a maximum displacement volume if a rotation rate equal to or higher than the rotation rate upper limit is detected.

There may be provided a means for motor displacement volume control that controls the displacement volume of the motor in correspondence to the travel pressure at the travel motion motor; the displacement volume of the travel motion motor may be increased if a rotation rate equal to or higher than the rotation rate upper limit is detected; control for increasing the displacement volume of the travel motion motor may be stopped once the rotation rate of the travel motion motor becomes equal to or less than a predetermined rotation rate lower limit which is at least lower than the rotation rate upper limit, and the displacement volume of the travel motion motor may be controlled in correspondence to the traveling pressure.

It is preferred that the displacement volume of the travel motion motor is gradually increased, and the displacement volume of the travel motion motor is increased so that the displacement volume of the travel motion motor becomes 40% to 70% of a maximum displacement volume of the travel motion motor.

There may be provided a variable relief valve that allows a relief pressure of the pressure oil from the travel motion motor to be altered; and the relief pressure at the variable relief valve may be increased by a means for motor over rotation prevention. In this case, it is preferred that the relief pressure at the variable relief valve is gradually increased.

The travel motion control apparatus described above achieves particularly notable advantages when installed in a hydraulically driven vehicle and especially in a wheel hydraulic excavator.

BEST MODE FOR CARRYING OUT THE INVENTION

First Embodiment

The following is an explanation of the first embodiment of the travel motion control apparatus according to the present invention, given in reference to FIGS. 1 to 5.

Figure 1:
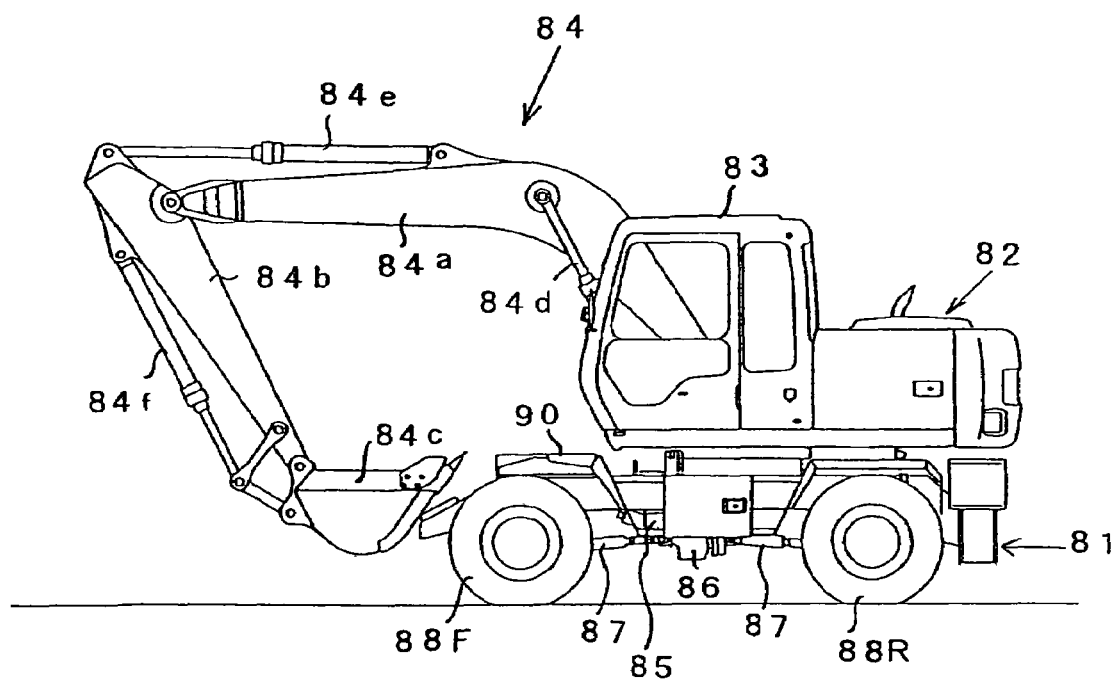
FIG. 1 is an external view of a wheel excavator in which the present invention is adopted.

FIG. 1 shows a wheel hydraulic excavator in which the present invention may be adopted. This wheel hydraulic excavator includes a traveling undercarriage (a lower traveling body) 81 and an upper revolving superstructure 82 rotatably mounted on top of the traveling undercarriage 81. An operator's cab 83 and a work front attachment 84 are disposed at the upper revolving superstructure 82. The front attachment 84 is constituted with a boom 84$a$ rotatably connected to the main body of the upper revolving superstructure 82, an arm 84$b$ rotatably connected to the boom 84$a$ and a bucket 84$c$ rotatably connected to the arm 84$b$. The boom 84$a$ is raised and lowered with a boom cylinder 84$d$, the arm 84$b$ is raised and lowered with an arm cylinder 84$e$, and the bucket 84$c$ is engaged in digging and dumping operations via a bucket cylinder 84$f$. At the traveling undercarriage 81, a travel motion hydraulic motor 85, a transmission 86 and a drive shaft 87 are provided and the drive shaft 87 drives front tires 88F and rear tires 88R. Reference numeral 90 indicates a fender cover.

Figure 2:
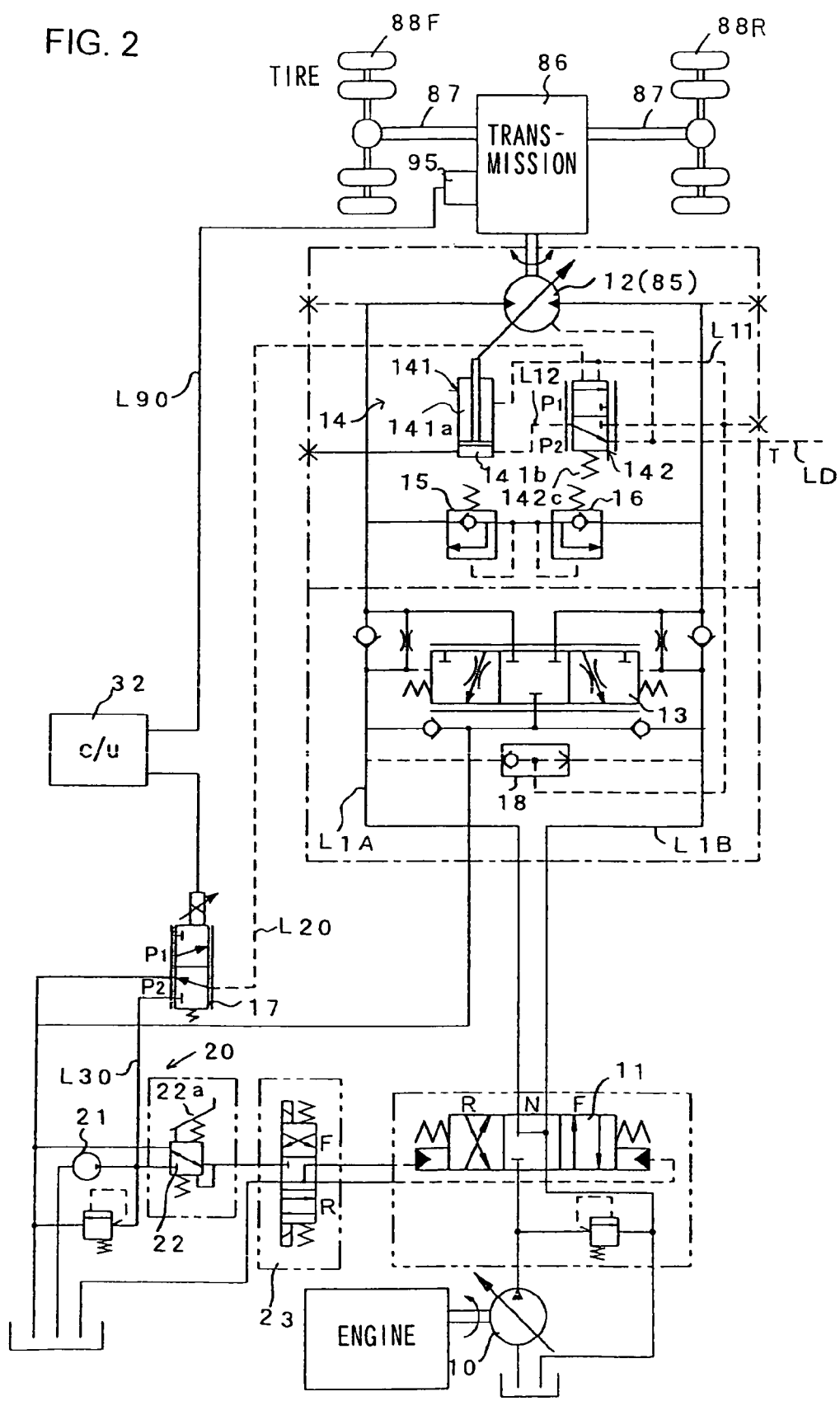
FIG. 2 is a circuit diagram of the travel motion hydraulic circuit in the hydraulically driven vehicle achieved in a first embodiment of the present invention.

FIG. 2 shows the travel motion hydraulic circuit in the hydraulically driven vehicle achieved in the first embodiment of the present invention. This hydraulic circuit includes a hydraulic pump 10 that is driven by the engine, a travel motion control valve 11 that is operated through a pilot hydraulic circuit 20 to be detailed later and controls the flow rate and the flow direction of the oil output from the hydraulic pump 10, a travel motion variable displacement hydraulic motor 12 (corresponds to 85 in FIG. 1) which is driven with the pressure oil controlled with the travel motion control valve 11, a counterbalance valve 13 disposed between the travel motion control valve 11 and the hydraulic motor 12, a regulator 14 that adjusts the displacement volume (capacity) of the hydraulic motor 12 and crossover load relief valves 15 and 16 that respectively regulate the maximum pressures in main pipelines L1A and L1B connecting the control valve 11 and the hydraulic motor 12 to each other.

The regulator 14 includes a piston 141 and a servo valve 142. A rod chamber 141a at the piston 141 is connected via a pipeline L11 with a shuttle valve 18 used to select the high pressure oil either in the main pipeline L1A or in the main pipeline L1B. A bottom chamber 141b at the piston 141 is connected to the servo valve 142 via a pipeline L12. The servo valve 142 is switched with a pilot pressure from the pipeline L11 or from a pipeline L20. As the servo valve 142 is switched to a P2 position, the bottom chamber 141b comes into communication with a drain circuit of the hydraulic motor 12 via a pipeline LD, whereas as the servo valve 142 is switched to a P1 position, the bottom chamber 141b comes into communication with the shuttle valve 18 via the pipeline L11.

The structural features characterizing the travel motion control apparatus in the embodiment include a rotation rate sensor 95 that is mounted at the transmission 86 and detects the rotation rate of the hydraulic motor 12, a detection line L90 through which a signal output from the rotation rate sensor 95 is extracted, a controller 32 that executes the processing to be detailed later based upon the signal provided through the detection line L90 and an electromagnetic proportional valve 17 that is driven in response to a signal provided by the controller 32. The controller 32 is constituted with a CPU, a RAM, an input/output interface and the like.

As a voltage output from the controller 32 is applied to the solenoid in the electromagnetic proportional valve 17, the electromagnetic proportional valve 17 is switched to the P1 position in correspondence to the output voltage. As a result, the pipeline L20 and a pipeline L30 connected to the pilot hydraulic pump 21 come into communication with each other and the pressure oil achieving a pressure level corresponding to the output voltage V from the controller 32 is guided into the pipeline L20. When the voltage output from the controller 32 stops (v=0), the electromagnetic proportional valve 17 is switched to the P2 position. At this setting, the pipelines L20 and L30 no longer communicate with each other and the pressure in the pipeline L20 becomes equal to the tank pressure.

The pilot hydraulic circuit 20 includes a pilot hydraulic pump 21, a travel motion pilot valve 22 operated through an accelerator pedal 22a and a forward/reverse switching valve 23 which is switched to a forward position, a reverse position or a neutral position in response to an operation of a forward/reverse change-over switch (not shown). The switching direction and the stroke quantity of the control valve 11 are controlled with the pilot pressure supplied from the pilot hydraulic circuit 20.

The direction and the flow rate of the pressure oil output from the hydraulic pump 10 are controlled through the control valve 11, and the controlled pressure oil is supplied to the hydraulic motor 12 through the counterbalance valve 13. The pressure oil supplied to the hydraulic motor 12 causes the hydraulic motor 12 to rotate. The rotation of the hydraulic motor 12 is first communicated to the transmission 86 where the rotation speed is reduced at a predetermined gear ratio, and then is communicated to the tires 88F and 88R via the drive shaft 87. The hydraulic excavator is thus caused to travel.

In FIG. 2, the forward/reverse switching valve 23 assumes the neutral (N) position and the pilot valve 22 is not in an operated state. Under these circumstances, no pilot pressure is applied to the control valve 11 and the control valve 11 is at the neutral position. Thus, the pressure oil from the hydraulic pump 10 is not supplied to the hydraulic motor 12 and the vehicle is in a stopped state.

The hydraulic circuit in FIG. 2 engages in operation as described below.

As the forward/reverse switching valve 23 is switched to the forward (F) position or the reverse (R) position and the accelerator pedal 22a is depressed, the pilot pressure oil output from the pilot valve 22 travels to a pilot port at the control valve 11, which is switched to the F position or the R position with a stroke quantity corresponding to the pilot pressure. In response, the hydraulic motor 12 is driven and the vehicle engages in travel motion.

When the vehicle starts traveling, a travel pressure, the level of which corresponds to the load, is generated in the pipeline L1A or L1B disposed between the control valve 11 and the counterbalance valve 13. This pressure is guided as a torque control pressure to the regulator 14 from the shuttle valve 18 via the pipeline L11. As a result, the servo valve 142 is switched to the P1 position. As the servo valve 142 is switched as described above, the rod chamber 141a and the bottom chamber 141b at the piston 141 come into communication with each other and the torque control pressure is guided into both chambers. Since the pressure receiving area in the bottom chamber 141b is greater than the pressure receiving area in the rod chamber 141a, causing the piston to extend, thereby increasing the displacement volume q of the hydraulic motor 12, under these circumstances. It is to be noted that when the travel pressure is at the maximum level, the servo valve 142 is switched to the maximum position on the P1 side to allow the hydraulic motor 12 to achieve a maximum displacement volume qmax.

As the vehicle starts to travel at a constant speed and the travel pressure decreases, the torque control pressure applied to the regulator 14 becomes lowered, and the servo valve 142 is switched to the P2 position side with the force applied by a spring 142c. This change-over in the position of the servo valve causes the bottom chamber 141b to communicate with the drain circuit via the pipeline LD, thereby causing the piston to retract. As a result, the displacement volume q of the hydraulic motor 12 becomes smaller.

The operation described above is executed while the vehicle travels on a flat surface, for instance. While the vehicle travels on a flat surface, the rotation rate of the hydraulic motor 12 is kept to a level equal to or less than a rotation rate limit NLim which is a tolerable rotation rate value and the electromagnetic proportional valve 17 is switched to the P2 position as explained later. Thus, the pilot pressure inside the pipeline L20 is equal to the tank pressure, the torque control pressure from the shuttle valve 18 alone is applied to the regulator 14, and the displacement volume q of the hydraulic motor 12 is controlled so as not to deviate from a range between the minimum volume qmin and the maximum volume qmax, in correspondence to the level of the traveling pressure.

However, when the vehicle travels downhill, the vehicle is accelerated by gravity, which decreases the travel pressure in the pipelines L1A and L1B and allows the servo valve 142 at the regulator 14 to be switched to the P2 position side with the force imparted by the spring 142c. As a result, the motor displacement volume q becomes smaller, thereby reducing the braking force applied to the vehicle, which poses a risk of the motor rotation rate N becoming higher than the rotation rate limit NLim. In order to ensure that this does not happen, the following processing is executed in the controller 32 to implement motor displacement volume control in the embodiment.

Figure 3:
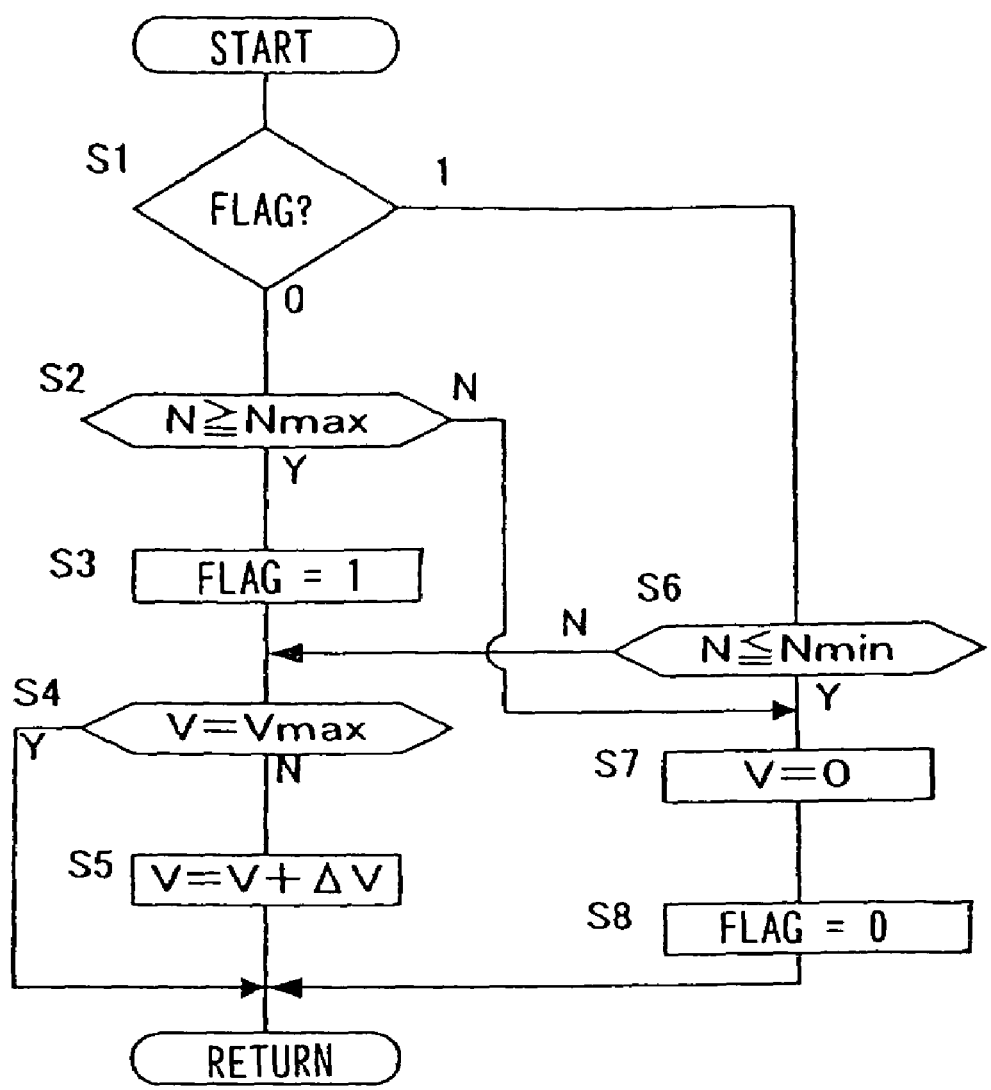
FIG. 3 presents a flowchart of the processing executed by the controller constituting the travel motion control apparatus in the first embodiment of the present invention.

FIG. 3 presents a flowchart of an example of the processing executed in the controller 32 in the first embodiment. First, a decision is made by checking a flag in step S1 as to whether or not the motor displacement volume control is currently implemented. If the flag is set to 0, it is judged that the motor displacement volume control is not in progress and the operation proceeds to step S2 to make a decision as to whether or not the motor rotation rate N detected by the rotation rate sensor 95 is equal to or higher than a maximum rotation rate Nmax set in advance. The maximum rotation rate Nmax is set to a value equal to or greater than a motor rotation rate Nstd at which the motor rotates when the vehicle travels on a flat surface at maximum speed and less than the rotation rate limit NLim, e.g., Nmax=Nstd. The operation proceeds to step S3 if it is decided in step S2 that N≧Nmax, whereas the operation proceeds to step S7 if it is decided that N<Nmax. In step S3, the flag is set to 1 to start the motor displacement volume control.

Figure 4:
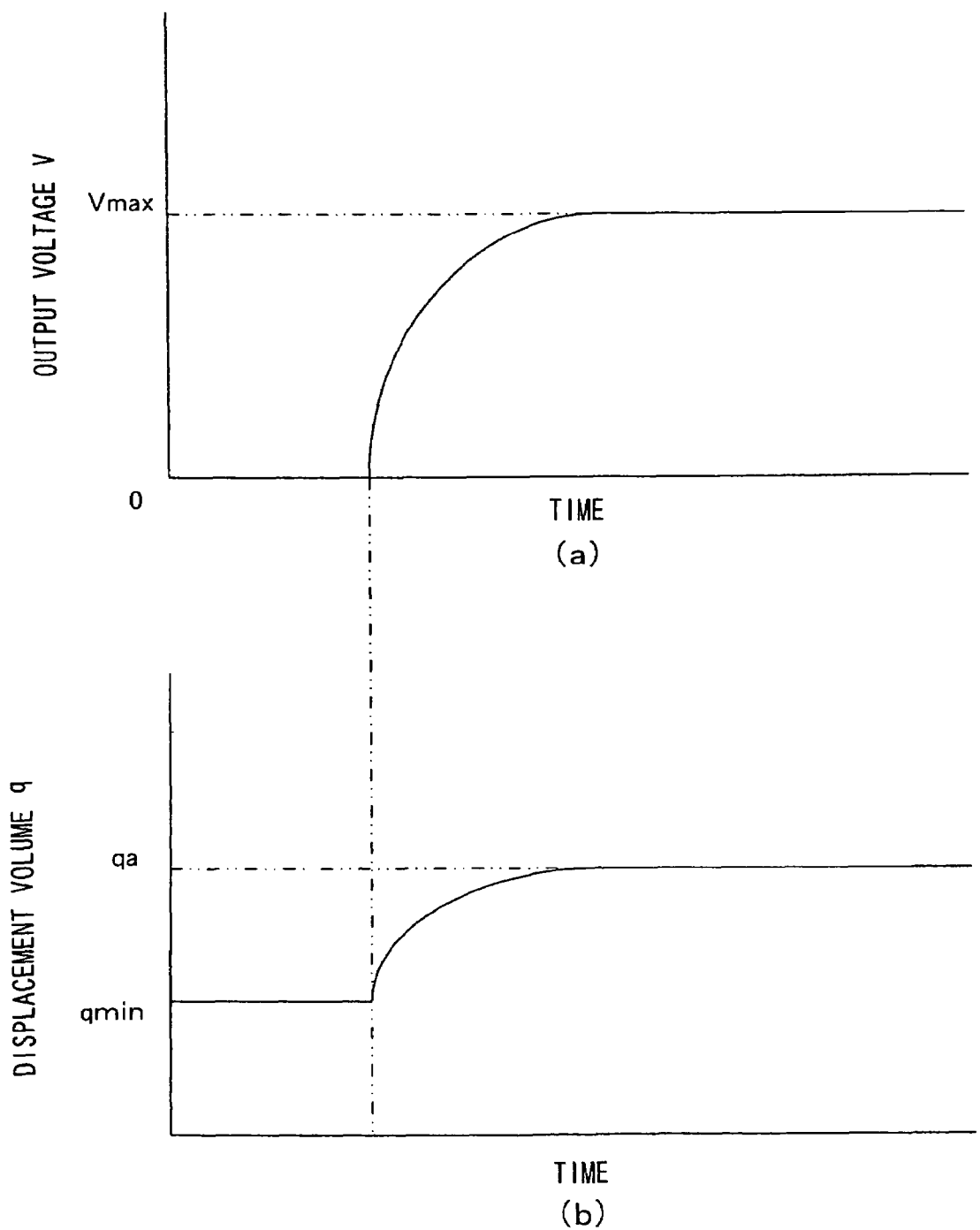
FIG. 4($a$) shows an example of the voltage characteristics of the voltage output to the electromagnetic proportional valve through the processing in FIG. 3 and FIG. 4($b$) shows the corresponding change occurring in the motor displacement volume.

Next, the operation proceeds to step S4 to make a decision as to whether or not the voltage V output to the electromagnetic proportional valve 17 is equal to a maximum output voltage Vmax. The operation proceeds to step S5 if a negative decision is made in step S4, whereas the operation skips step S5 and returns to the start if an affirmative decision is made in step S4. In step S5, the output voltage V to the electromagnetic proportional valve 17 is increased by a slight quantity ΔV. ΔV, which is a time function, is set so as to decrease gradually as time passes. Thus, the output voltage V is gradually increased until it reaches the maximum output voltage Vmax while its increase rate becomes gradually smaller, as shown in FIG. 4($a$).

If, on the other hand, it is decided in step S1 that the flag is set to 1, i.e., if it is decided that the motor displacement volume control is currently in effect, the operation proceeds to step S6 to make a decision as to whether or not the motor rotation rate N detected by the rotation rate sensor 95 is equal to or less than a predetermined minimum rotation rate Nmin. The minimum rotation rate Nmin is set equal to or less than the motor rotation rate Nstd at which the motor rotates when the vehicle travels on a flat surface at maximum speed and less than the maximum rotation rate Nmax (e.g., Nmin=0.9× Nmax). The operation proceeds to step S7 if it is decided in step S6 that N≦Nmin, whereas the operation proceeds to step S4 if it is decided that N>Nmin. In step S7, the voltage V output to the electromagnetic proportional valve 17 is reduced to 0 and then the flag is set to 0 in the following step S8 to halt the motor displacement volume control.

The operation of the travel motion control apparatus achieved in the first embodiment, which adopts the structure described above, is now explained in more specific terms.

The motor rotates at the rotation rate N equaled or less than the maximum rotation rate Nmax when the vehicle travels on a flat surface under normal circumstances. Thus, the electromagnetic proportional valve 17 is switched to the P2 position through the processing (step S7) described earlier to control the displacement volume q of the hydraulic motor 12 with the travel pressure alone. Namely, the motor displacement volume control according to the present invention is not implemented to prevent motor over rotation in this situation.

When the vehicle travels downhill, the travel pressure is low, the motor displacement volume q becomes equal to, for instance, the minimum volume qmin and thus, the motor rotation rate N increases. Then, as the motor rotation rate N becomes equal to the maximum rotation rate Nmax, the motor displacement volume control for over rotation prevention starts and the voltage V output to the electromagnetic proportional valve 17 is gradually increased from the minimum volume qmin through the processing explained earlier (step S5). Thus, the pressure (the torque control pressure) in the pipeline L20 increases, thereby switching the servo valve 142 to the P1 position, and the motor displacement volume q gradually increases, as shown in FIG. 4($b$).

When the output voltage V reaches the maximum voltage level Vmax, the pressure inside the pipeline L20 reaches the maximum level as well and the displacement volume q increases up to a predetermined value qa. This causes an increase in the hydraulic braking force at the hydraulic motor 12 and the over rotation of the hydraulic motor 12 is thus prevented. In this situation, while the predetermined value qa is determined in conformance to the maximum pressure level in the pipeline L20, the maximum pressure inside the pipeline L20 is adjusted so as to ensure that the predetermined value qa is smaller than the value of the maximum volume qmax and preferably the predetermined value qa is 40% to 70% of the maximum volume value qmax. As a result, since the extent to which the displacement volume q changes is smaller than the extent of change occurring when the motor displacement volume q is increased to the maximum volume qmax and the displacement volume q is increased gradually, no abrupt change is allowed to occur while the speed is being reduced and operator comfort is improved.

Once the motor rotation rate N becomes equal to or less than the minimum rotation rate Nmin through the motor displacement volume control, the voltage V output to the electromagnetic proportional valve 17 is set to 0 through the processing (step S7) explained earlier. In response, the pressure inside the pipeline L20 becomes equal to the tank pressure, the increase in the motor displacement volume q achieved by using the pressure oil inside the pipeline L20 stops and the motor displacement volume control is halted. Subsequently, the displacement volume q of the hydraulic motor 12 is controlled in correspondence to the traveling pressure. As a result, it becomes possible to run the vehicle at an appropriate speed by reducing the hydraulic braking force at the hydraulic motor 12. Then, once the motor rotation rate N becomes equal to the maximum rotation rate Nmax, the same operation is repeatedly executed.

Figure 5:
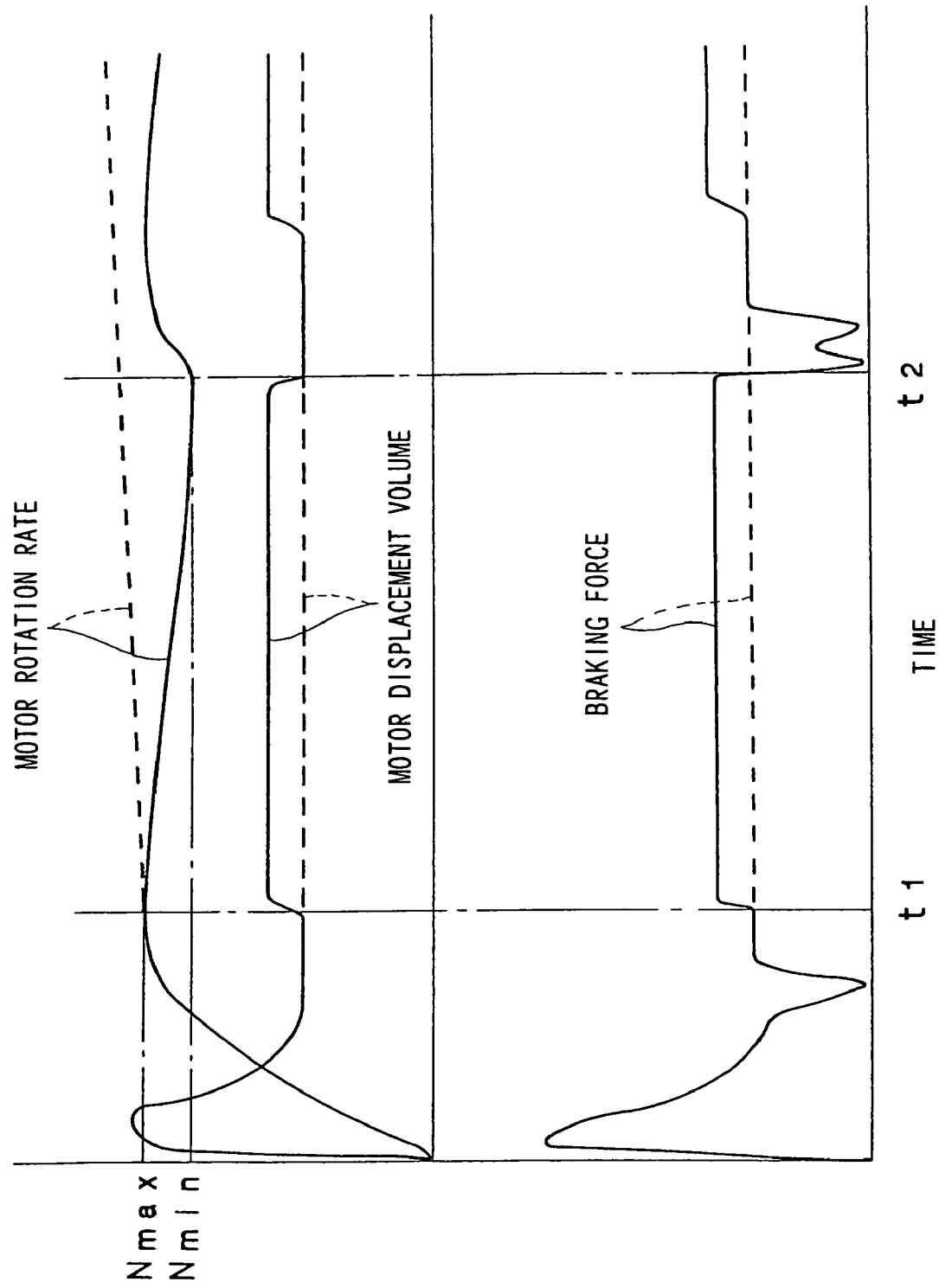
FIG. 5 shows the characteristics manifesting with regard to the motor rotation rate, the motor displacement volume and the braking force when the vehicle travels downhill in the first embodiment.

FIG. 5 is a diagram of the motor rotation rate N, the motor displacement volume q and the hydraulic braking force at the hydraulic motor 12, measured while the vehicle travels downhill. It is to be noted that the characteristics achieved by implementing the motor displacement volume control are indicated by solid lines and the characteristics manifesting when the motor displacement volume control is not implemented are indicated by dotted lines in the figure. In the embodiment, the motor displacement volume control is started as the motor rotation rate N reaches the maximum rotation rate level Nmax at a time point t1, and the motor displacement volume q increases until the volume becomes equal to the predetermined value qa as indicated by the solid line in the figure. In response, the motor rotation rate N is decreased, the braking force increases and the vehicle speed is lowered. As the motor rotation rate N is decreased to a level equal to the minimum rotation rate Nmin at a time point t2, the motor displacement volume control stops and the motor displacement volume q is decreased. As a result, the motor rotation rate N increases to ensure that abrupt braking is not applied to the vehicle.

In contrast, when the motor displacement volume control is not implemented, the motor displacement volume q does not increase even if the motor rotation rate N reaches the level equal to the maximum rotation rate Nmax, as indicated by the dotted line in the figure. As a result, the risk of the motor rotation rate N becoming higher than the maximum rotation rate Nmax as well as the risk of failure to achieve the necessary braking force to result in an increase in the traveling speed, arises.

As described above, the motor displacement volume control is implemented so as to increase the motor displacement volume q when the rotation rate N of the hydraulic motor 12 is equal to or greater than the maximum rotation rate Nmax in the first embodiment. As a result, the braking force applied to the hydraulic motor 12 increases to prevent over rotation of the motor 12, regardless of the specific position assumed by the control valve 11. Since the motor displacement volume control for over rotation prevention is halted once the motor rotation rate N is reduced to a level equal to or lower than the minimum rotation rate Nmin, the vehicle is not allowed to slow down to an excessive extent. Since the motor displacement volume q is gradually increased from the minimum volume qmin to a volume equal to the predetermined value qa which is smaller than the maximum volume qmax through the motor displacement volume control, the extent of the shock occurring as the displacement volume q changes is minimized. In addition, since the hydraulic brake is engaged by increasing the motor displacement volume q through the motor displacement volume control, it is not necessary to add a special braking device and thus, the travel motion control apparatus can be achieved at low cost.

Second Embodiment

Figure 6:
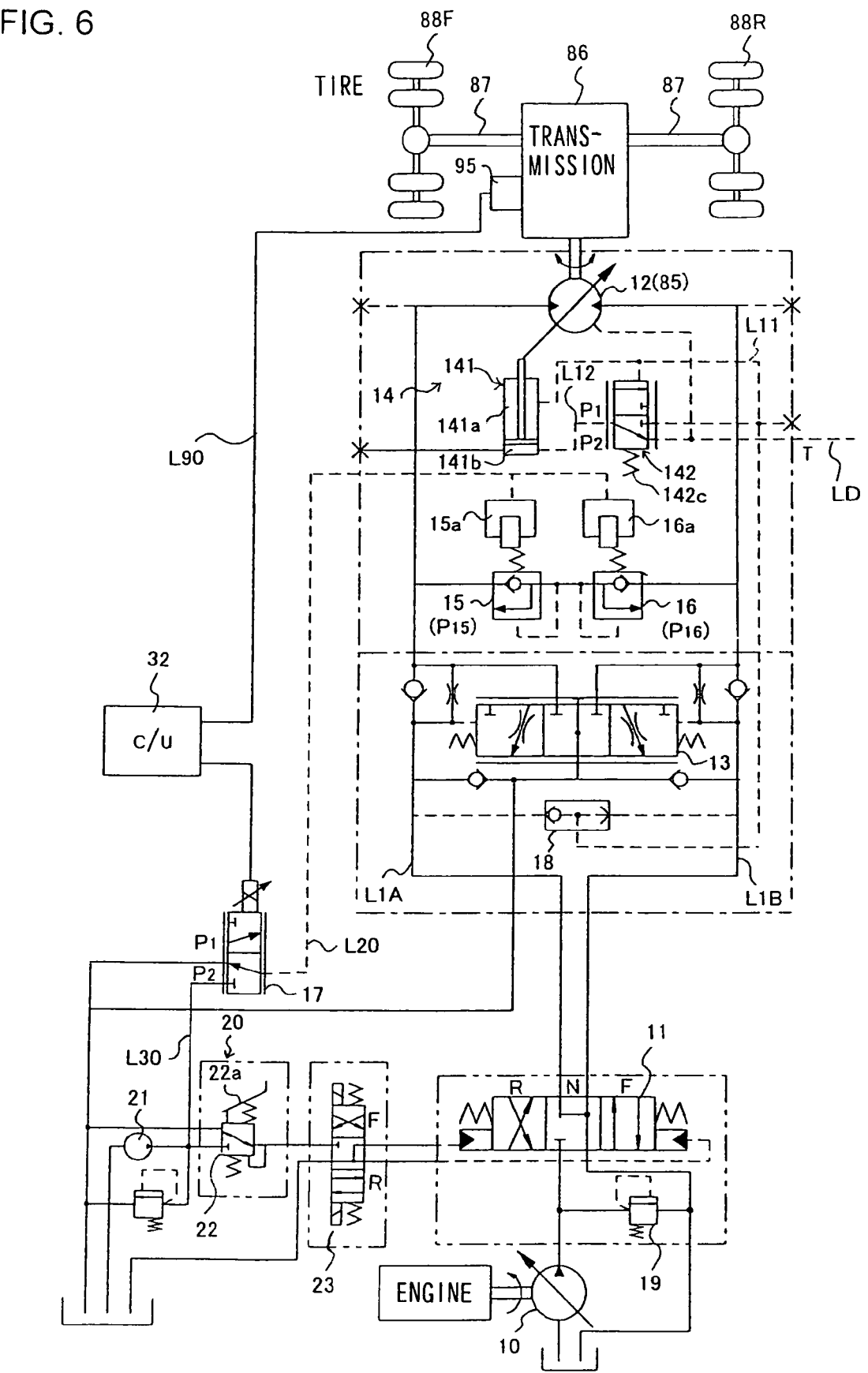
FIG. 6 is a circuit diagram of the travel motion hydraulic circuit in the hydraulically driven vehicle achieved in a second embodiment of the present invention.
Figure 7:
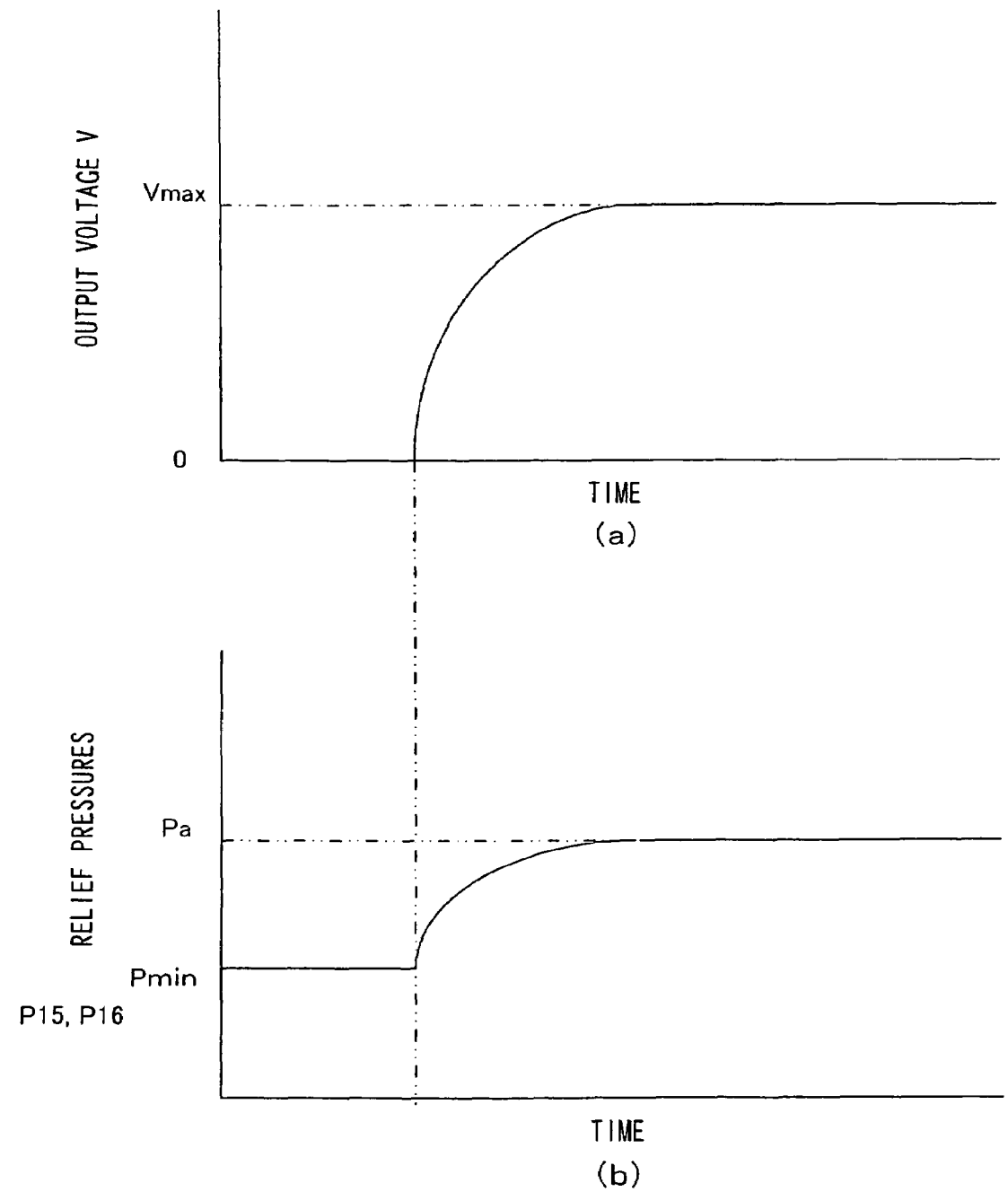
FIG. 7($a$) shows an example of the voltage characteristics of the voltage output to the electromagnetic proportional valve in FIG. 6 and FIG. 7($b$) shows the corresponding change occurring in the motor displacement volume.
Figure 8:
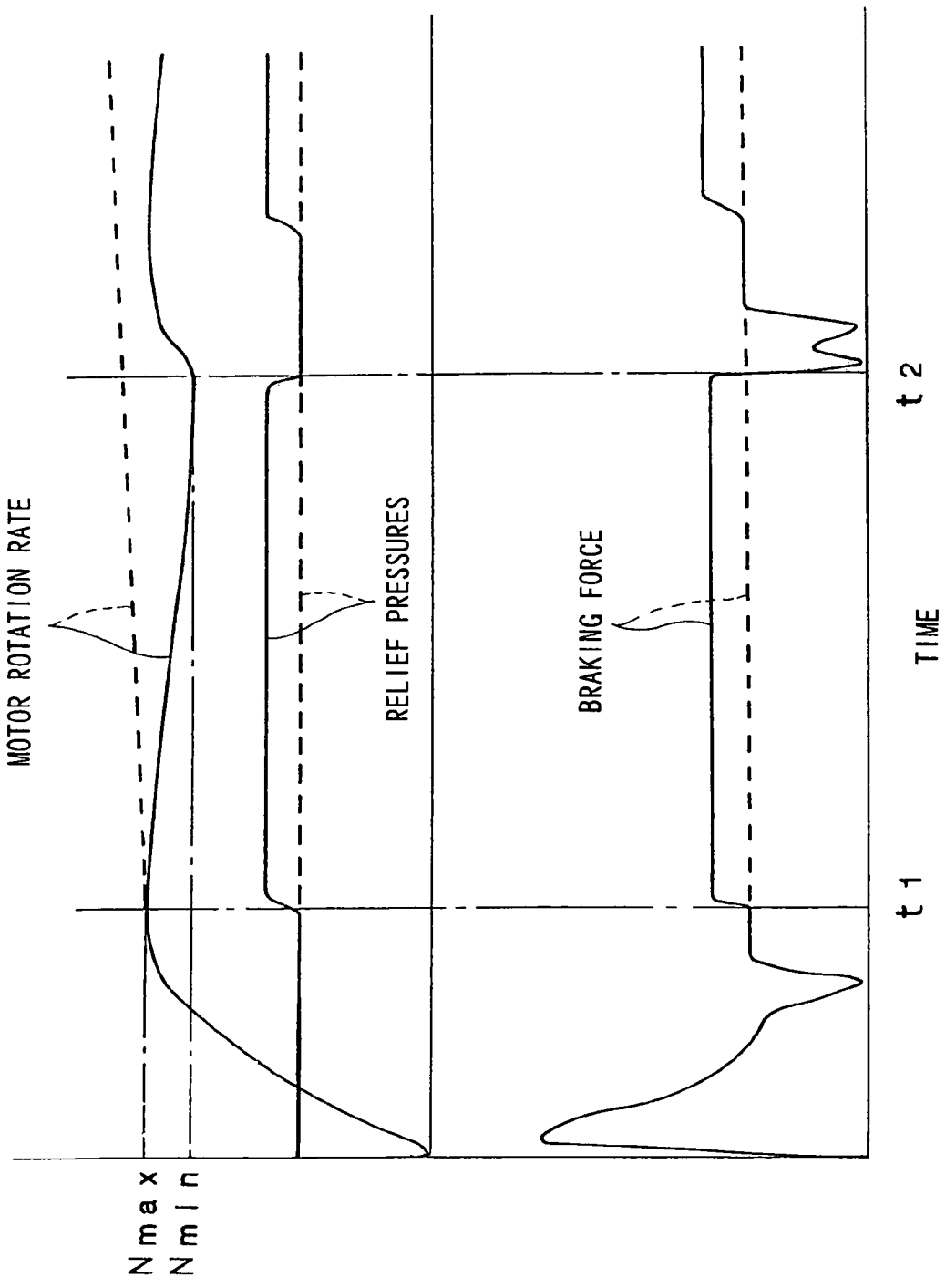
FIG. 8 shows the characteristics manifesting with regard to the motor rotation rate, the motor displacement volume and the braking force when the vehicle travels downhill in the second embodiment.

The travel motion control apparatus achieved in the second embodiment of the present intention is now explained in reference to FIGS. 6 to 8.

While the hydraulic braking force is increased through the displacement volume control implemented on the hydraulic motor 12 so as to prevent motor over rotation in the first embodiment, motor over rotation is prevented in the second embodiment by controlling the relief pressures at relief valves 15 and 16.

FIG. 6 is a circuit diagram of the travel motion hydraulic circuit in the hydraulically driven vehicle achieved in the second embodiment. It is to be noted that the same reference numerals are assigned to components identical to those in FIG. 2 and the following explanation focuses on the differences from FIG. 2.

As shown in FIG. 6, the relief valves 15 and 16 are variable relief valves and their relief pressures P15 and P16 change in correspondence to the hydraulic forces applied to oil chambers 15a and 16a respectively. The oil chambers 15a and 16a are each connected to an electromagnetic switching valve 17 via the pipeline L20, and the pressures inside the oil chambers 15a and 16a, i.e., the relief pressures P15 and P16, are controlled by switching the electromagnetic switching valve 17. If the electromagnetic switching valve 17 is switched toward the P1 position with the voltage V output from the controller 32, the relief pressures P15 and P16 increase in response to the switchover, whereas if the electromagnetic switching valve 17 is switched to the P2 position, the relief pressures P15 and P16 are lowered to the level of a minimum relief pressure Pmin. The relief pressures P15 and P16 regulate the hydraulic braking force at the motor 12, and if the relief pressures P15 and P16 are low, the hydraulic braking force, too, is low. It is to be noted that the minimum relief pressure Pmin is set to a value which is greater than, at least, the relief pressure at a relief valve 19 disposed on the downstream side of the hydraulic pump 10.

The processing executed by the controller 32 is basically similar to that shown in FIG. 3. Namely, as the motor rotation rate N becomes equal to or greater than the maximum rotation rate Nmax, the voltage V output from the controller 32 gradually increases to the level of the maximum output voltage Vmax, as shown in FIG. 7(a) (step S4, step S5). In response, the relief pressures P15 and P16 gradually increased from the level of the minimum relief pressure Pmin to the level equal to a predetermined value Pa, as shown in FIG. 7(b). The predetermined value Pa is set to a value greater than the minimum relief pressure Pmin by 10 to 30%, by taking into consideration the pressure withstanding performance and the like of the hydraulic parts.

FIG. 8 shows an example of the operating characteristics manifesting while the vehicle travels downhill. In the figure, the solid lines indicate the characteristics manifesting when the relief pressure control is implemented, whereas the dotted lines indicate the characteristics manifesting when the relief pressure control is not implemented. When the motor rotation rate N is less than the maximum rotation rate Nmax, the electromagnetic switching valve 17 is switched to the P2 position and the relief pressures P15 and P16 at the relief valves 15 and 16 become equal to the minimum relief pressure Pmin.

As the motor rotation rate N reaches the level equal to the maximum rotation rate Nmax at a time point t1, the electromagnetic switching valve 17 is switched toward the P1 position and the relief pressures P15 and P16 increase as indicated by the solid line in the figure. While traveling downhill, the vehicle is accelerated by gravity and the pressure in the output-side pipeline L1A or L1B increases due to the pumping function of the motor 12. At this time, the pressure inside the pipeline L1A or L1B is controlled with relief valves 15 and 16, and the higher the relief pressures P15 and P16, the greater the output-side pressure at the motor 12, i.e., the force resisting the rotation of the motor increases as the relief pressures P15 and P16 become higher. As a result, the hydraulic braking force increases as indicated by the solid line in the figure, slowing down the vehicle. As the motor rotation rate N becomes lowered to the minimum rotation rate Nmin at a time point t2, the relief pressures P15 and P16 are reduced to the level of the minimum relief pressure Pmin, thereby decreasing the hydraulic braking force. Thus, an excessively large braking force is not applied to the vehicle when traveling at low speed to cause it to stop abruptly.

As explained above, when the rotation rate N of the hydraulic motor 12 is equal to or higher than the level of the maximum rotation rate Nmax, the relief pressures P15 and P16 at the relief valves 15 and 16 are raised so as to increase the hydraulic braking force applied to the motor 12 and thus to prevent over rotation of the motor 12 in the second embodiment. It is to be noted that since the displacement volume control is not implemented on the hydraulic motor 12, the hydraulic motor 12 used in the second embodiment does not need to be a variable displacement type motor and instead, it may be a fixed displacement motor.

Third Embodiment

The travel motion control apparatus achieved in the third embodiment of the present invention is now explained in reference to FIGS. 9 to 12.

The wheel hydraulic excavator shown in FIG. 1 can be mounted with various types of front attachments 84 depending upon the types of work it needs to perform. As the vehicle weight changes when a different attachment 84 is mounted, the inertial force of the vehicle traveling downhill also changes, altering the factor affecting the motor over rotation. The third embodiment is achieved by taking into consideration this point.

Namely, while the motor displacement volume q is increased from the minimum volume qmin to the predetermined value qa by a specific extent through the motor displacement volume control in the first embodiment, the extent to which the motor displacement volume q increases is adjusted in correspondence to the type of front attachment 84 mounted on the vehicle in the third embodiment.

Figure 9:
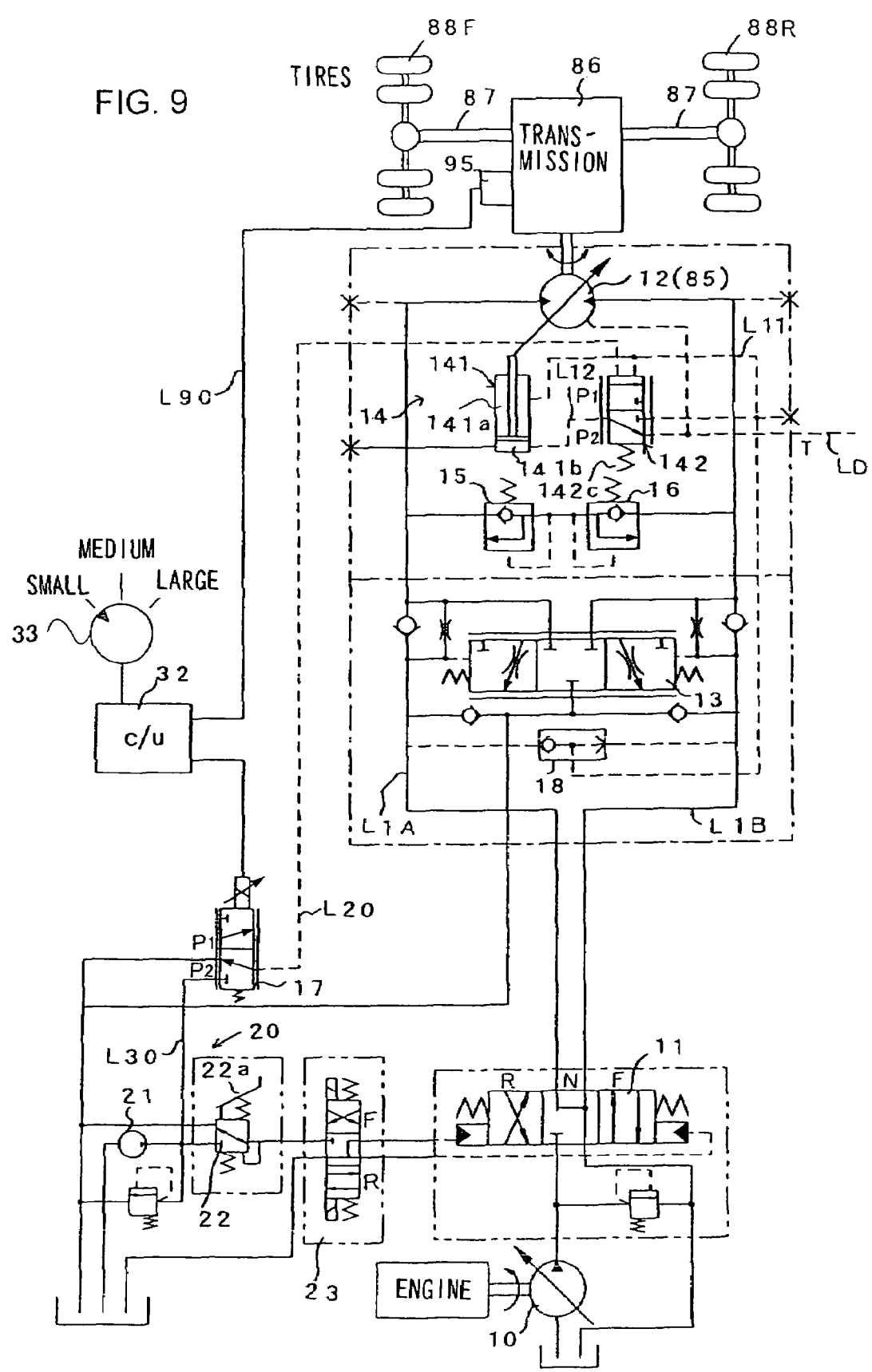
FIG. 9 is a circuit diagram of the travel motion hydraulic circuit in the hydraulically driven vehicle achieved in a third embodiment of the present invention.

FIG. 9 is a circuit diagram of the travel motion hydraulic circuit achieved in the third embodiment. It is to be noted that the same reference numerals are assigned to components identical to those in FIG. 2 and the following explanation focuses on the differences from FIG. 2. As shown in FIG. 9, a dial 33 for attachment selection is connected to the controller 32. The dial 33 is switched in correspondence to the specific type of front attachment 84 (e.g., a crusher or a bucket). To facilitate the explanation, it is assumed that the dial is switched to one of three stages, i.e., small, medium and large, in correspondence to the weight of the front attachment 84 mounted on the vehicle. The controller 32 executes the following processing based upon signals provided from the dial 33 and the rotation rate sensor 95.

Figure 10:
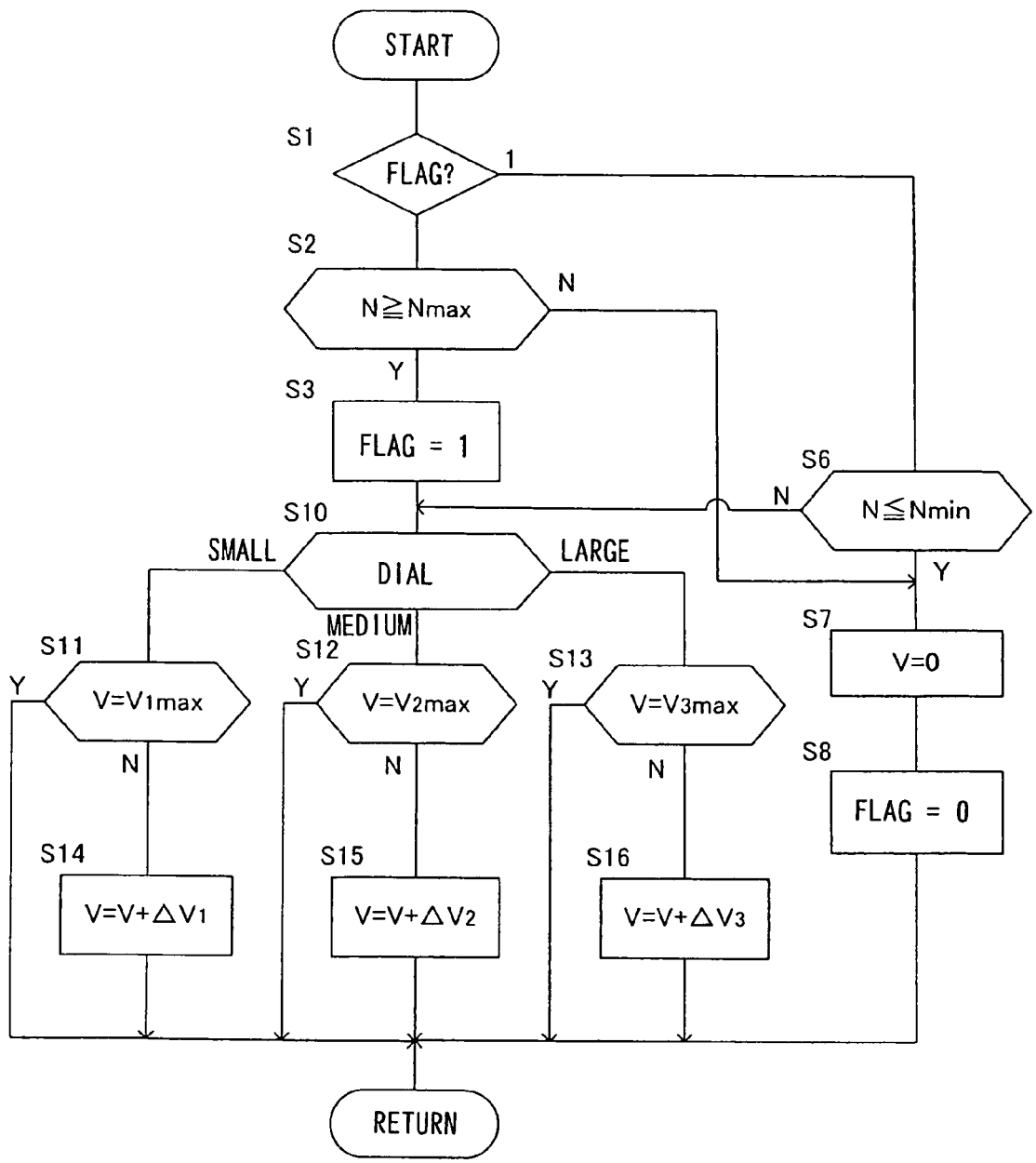
FIG. 10 presents a flowchart of the processing executed by the controller constituting the travel motion control apparatus in the third embodiment of the present invention.
Figure 11:
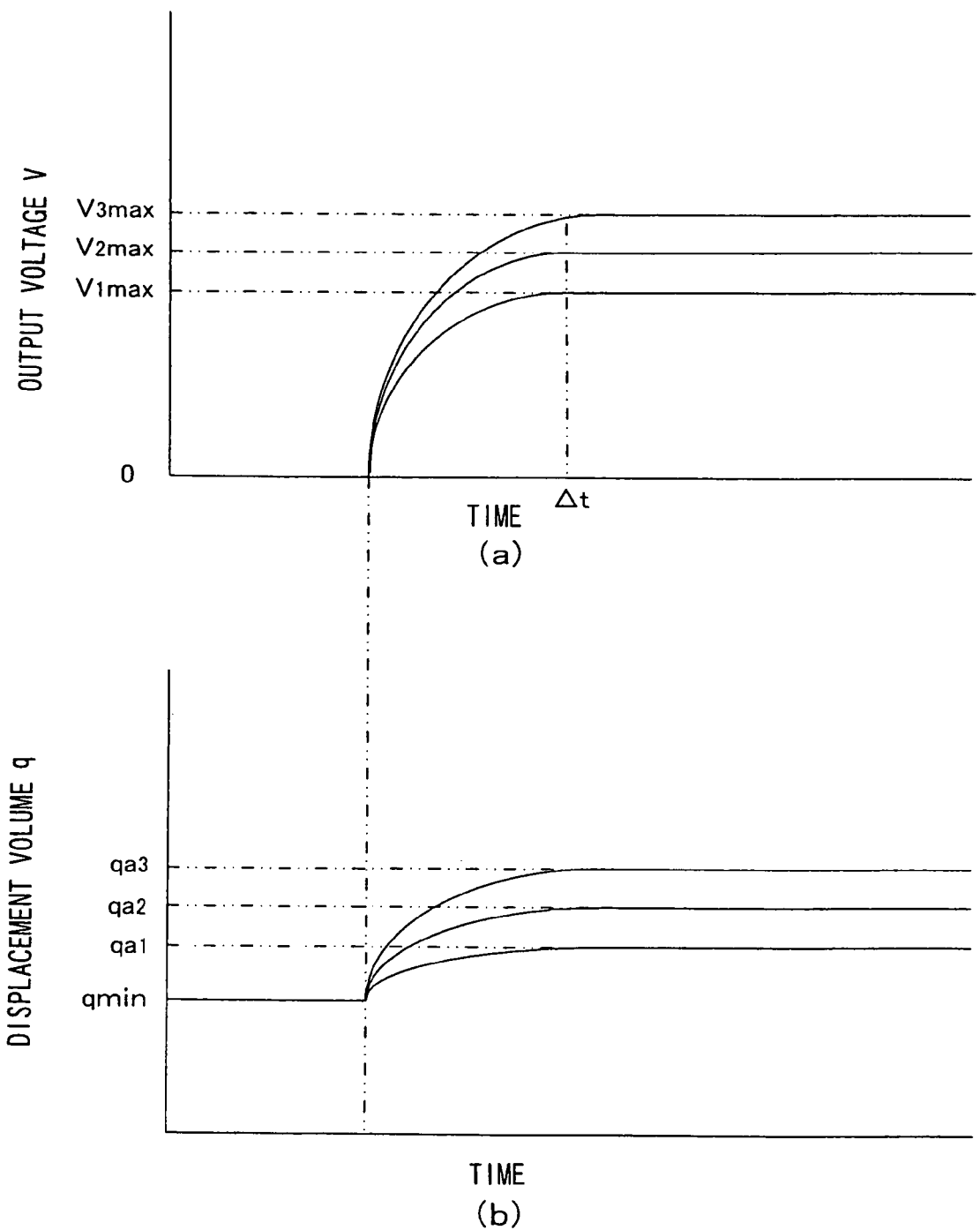
FIG. 11($a$) shows an example of the voltage characteristics of the voltage output to the electromagnetic proportional valve in FIG. 9 and FIG. 11($b$) shows the corresponding change occurring in the motor displacement volume.
Figure 12:
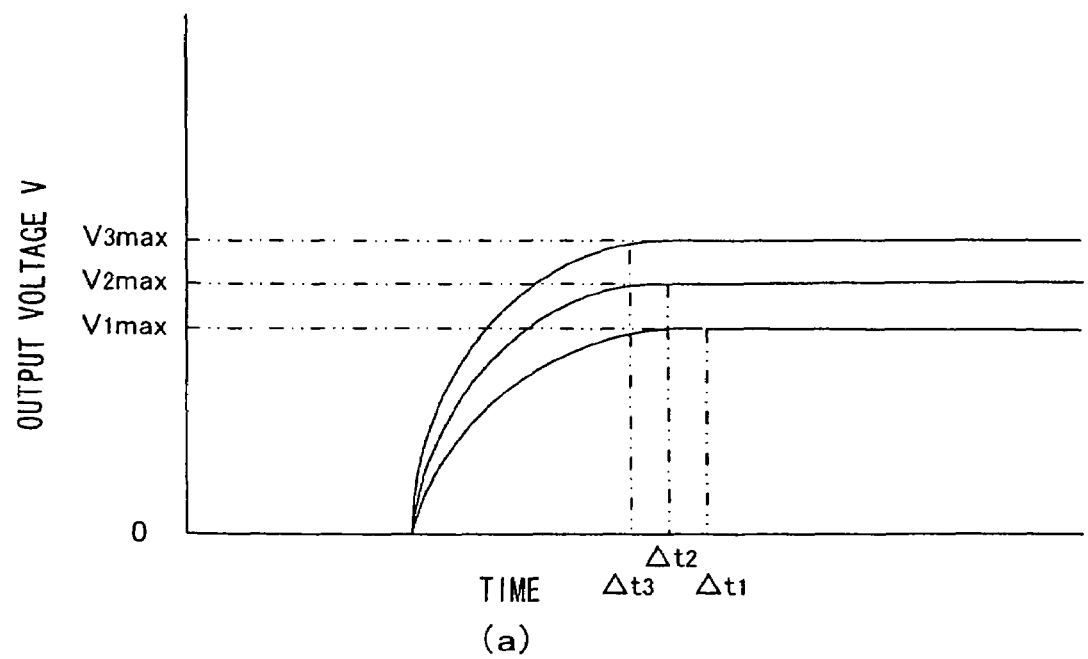
FIGS. 12($a$) and 12($b$) each present an example of a variation of the voltage characteristics shown in FIG. 11($a$)
Figure 12:
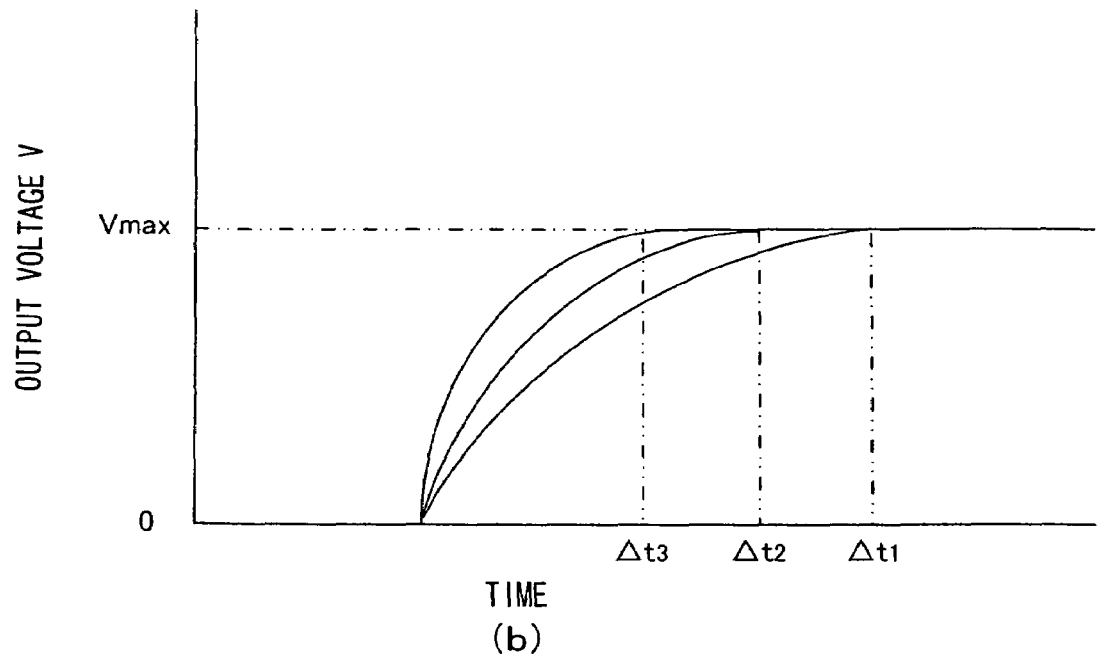

FIG. 10 presents a flowchart of an example of the processing executed in the controller 32 in the third embodiment. It is to be noted that the same step numbers are assigned to steps in which processing identical to that in FIG. 3 is executed and the following explanation focuses on the differences. After judging in step S2 that the motor rotation rate N is equal to or higher than the maximum rotation rate Nmax and setting the flag to 1 in step S3, the operation proceeds to step S10 to make a decision on the position to which the dial 33 is currently set. If it is decided that the dial is set at "small", i.e., if it is decided that the attachment weight is small, the operation proceeds to step S11. If it is decided that the dial is set at "medium", i.e., if it is decided that the attachment weight is medium, the operation proceeds to step S12. If it is decided that the dial is set at "large", i.e., if it is decided that the attachment weight is large, the operation proceeds to step S13.

In steps S11 to S13 respectively, a decision is made as to whether or not the voltage V output to the electromagnetic proportional valve 17 is equal to one of predetermined output voltages V1max to V3max. It is to be noted that these predetermined output voltage values are set so as to achieve a relationship express as V1max<V2max<V3max. If an affirmative decision is made in steps S11 to S13, the operation returns to the start point. If a negative decision is made in step S11, the operation proceeds to step S14 to increase the voltage output to the electromagnetic proportional valve 17 by a slight extent $\Delta V1$. If a negative decision is made in step S12, the operation proceeds to step S15 to increase the output voltage by a slight extent $\Delta V2$. If a negative decision is made in step S13, the operation proceeds to step S16 to increase the output by a slight extent $\Delta V3$. $\Delta V1$ to $\Delta V3$ are each a time function which is set so as to gradually decrease as time passes, and they are set so as to satisfy $\Delta V1<\Delta V2<\Delta V3$. As a result, the output voltage V gradually increases and the output voltage V reaches the level corresponding to the predetermined value V1max, V2max or V3max when a predetermined length of time $\Delta t$ elapses following the motor displacement volume control start, as shown in FIG. 11(a). Thus, the motor displacement volume q gradually increases so that the motor displacement volume q becomes equal to a predetermined value qa1, qa2 or qa3 when the predetermined length of time $\Delta t$ elapses following the motor displacement volume control start, as shown in FIG. 11(b).

The operation executed in the third embodiment is now explained in further detail.

In the third embodiment, the operator first switches the dial 33 in correspondence to the specific type of front attachment 84 mounted on the vehicle. For instance, he switches the dial to the "small" position if the vehicle has been mounted with a lightweight front attachment 84, whereas he switches the dial to the "large" position if the vehicle has been mounted with a heavy front attachment 84. If the vehicle travels downhill while the dial is set at "small" or "large" and the motor rotation rate N reaches a level equal to or higher than the maximum rotation rate Nmax, the motor displacement volume q gradually increases through the processing explained earlier (steps S11 and S14 or steps S13 and S16) to become equal to the predetermined value V1max or V3max after the predetermined length of time $\Delta t$. Thus, the braking force applied to the hydraulic motor 12 is increased to prevent motor over rotation.

Since the displacement volume q is made to increase by a greater extent as the vehicle weight becomes greater (qa3>qa1) in this situation, a desirable level of braking force corresponding to the inertial force can be imparted. Namely, the braking force is lowered if the inertial force is small so as to ensure that the operator does not experience discomfort due to excessive braking. In addition, if the inertial force is significant, the braking force is increased so as to prevent over rotation of the hydraulic motor 12 with a high degree of reliability.

As described above, by adopting the third embodiment in which the extent to which the motor displacement volume q increases is adjusted in correspondence to the type of front attachment 84 mounted on the vehicle, the braking force is made to increase to a greater extent as the inertial force becomes larger and, as a result, over rotation of the motor 12 can be reliably prevented without imparting and excessive braking force. In addition, since the motor displacement volume q is made to increase by a greater extent as the weight of the front attachment 84 becomes larger, the motor displacement volume q stops increasing when the predetermined length of time at elapses following the motor displacement volume control start.

It is to be noted that the voltage V output from the controller 32 may manifest characteristics different from those shown in FIG. 11(a). For instance, the output voltage V may manifest characteristics so that the output voltage V becomes equal to the predetermined value V1max, V2max or V3max sooner as the weight of the front attachment 84 becomes greater, i.e., $\Delta t1>\Delta t2>\Delta t3$, as shown in FIG. 12(a), instead of becoming equal to the predetermined value V1max, V2max or V3max after the predetermined length of time $\Delta t$. Alternatively, the increase rate of the output voltage V alone may be adjusted so as to allow the output voltage V to increase up to a predetermined level Vmax, as shown in FIG. 12(b). As a further alternative, the output voltage V may increase to the predetermined level V1max, V2max or V3max at a constant increase rate ($\Delta V1=\Delta V2=\Delta V3$). The patterns with which the output voltage V may increase are not limited to those described above, and the output voltage V may instead be made to increase in steps, for instance. In addition, the motor rotation rate Nmax detected at the motor displacement volume control start in step S2 and the motor rotation rate Nmin detected at the motor displacement volume control end in step S6 may be adjusted in correspondence to the level of the inertial force of the vehicle.

While the characteristics of the output voltage V are altered in correspondence to the specific type of front attachment 84 mounted on the vehicle, the characteristics of the output voltage V may be adjusted based upon the mounting state of another component (e.g., an outrigger (a stabilizer) or a blade) that affects the inertial force of the vehicle. In addition, the characteristics may be adjusted based upon the state of inclination of the vehicle. In this case, a tilt sensor, for instance, may be installed in the vehicle to detect the angle of inclination of the vehicle so as to enable the controller 32 to select the characteristics whereby the output voltage V increases to a greater degree as the downhill slope becomes steeper. Alternatively, the downhill grade of the road may be ascertained from road information or the like provided by a navigation apparatus and the characteristics of the output voltage V to be achieved while the vehicle travels downhill may be adjusted based upon the downhill grade.

Fourth Embodiment

Figure 13:
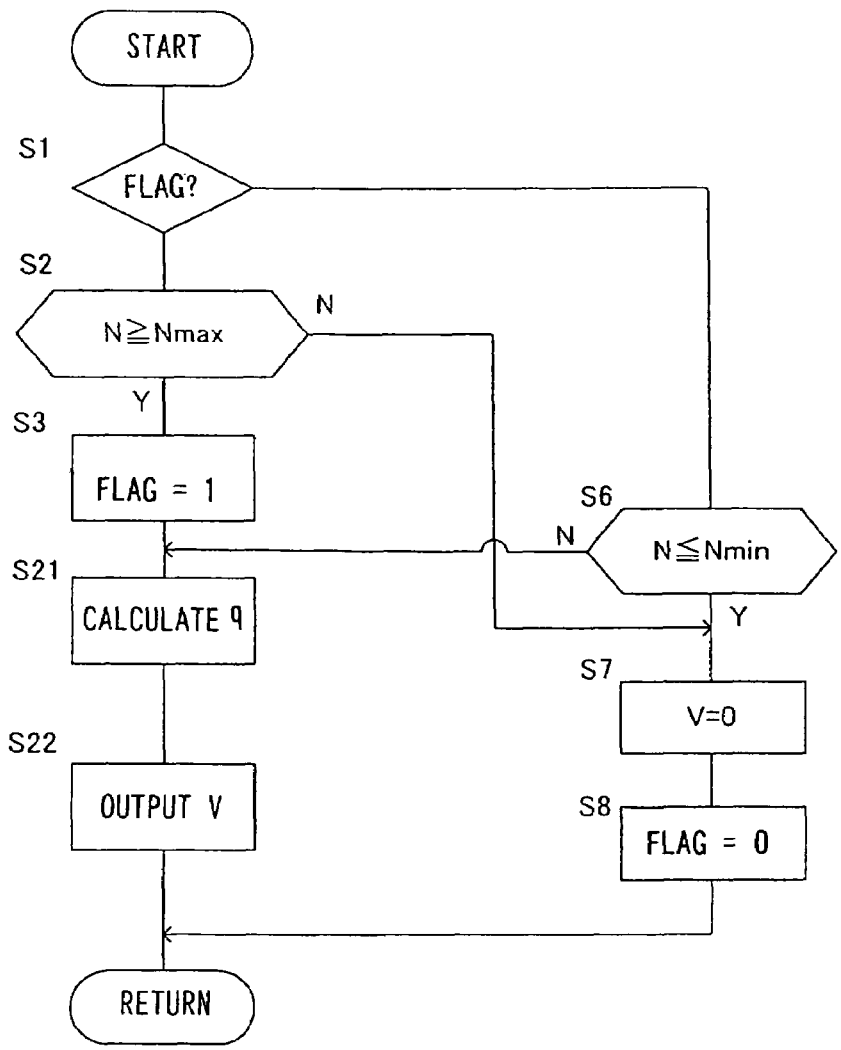
FIG. 13 presents a flowchart of the processing executed by the controller constituting the travel motion control apparatus in a fourth embodiment of the present invention.
Figure 14:
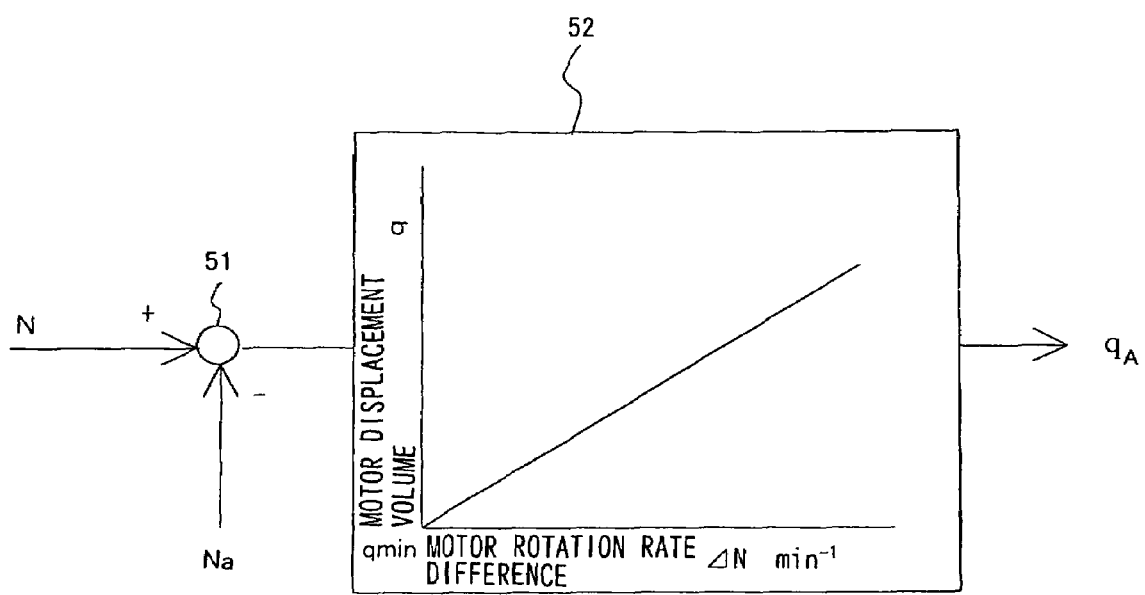
FIG. 14 is a block diagram of part of the processing in FIG. 13.

In reference to FIGS. 13 and 14, the travel motion control apparatus achieved in the fourth embodiment of the present invention is explained.

In the fourth embodiment, feedback control of the motor rotation N is executed so as to set the motor rotation rate N to a target rotation rate Na in the event of a motor over rotation. It is to be noted that since the hydraulic circuit of the travel motion control apparatus is similar to that shown in FIG. 1, the following explanation mainly focuses on the differences from the first embodiment.

FIG. 13 presents a flowchart of an example of the processing executed in the controller 32 in the fourth embodiment. It is to be noted that the same step numbers are assigned to steps in which processing identical to that in FIG. 3 is executed and the following explanation focuses on the differences. After judging in step S2 that the motor rotation rate N is equal to or higher than the maximum rotation rate Nmax and setting the flag to 1 in step S3, the operation proceeds to step S21. In step S21, a target displacement volume qA corresponding to a deviation $\Delta N$ of the motor rotation rate N relative to the target rotation rate Nmax is calculated as detailed later. Next, an output voltage V corresponding to the target displacement volume qA is output to the electromagnetic proportional valve 17 in step S22. As a result, the motor displacement volume q becomes equal to the target displacement volume qA, thereby equalizing the motor rotation rate N with the target rotation rate Na through the control.

FIG. 14 is a block diagram of the details of the processing executed in step S21. A subtractor 51 subtracts the target rotation rate Na determined in advance for the motor 12 from the motor rotation rate N detected by the rotation rate sensor 95 and thus ascertains a motor rotation rate difference $\Delta N$. It is to be noted that the target rotation rate Na may be set equal to, for instance, the maximum rotation rate Nmax. A function generator 52, at which characteristics whereby the motor displacement volume q increases in proportion to the motor rotation rate difference $\Delta N$ as shown in the figure are stored in advance, calculates the target displacement volume qA in conformance to these characteristics. It is to be noted that when the motor rotation rate difference $\Delta N$ is equal to or less than 0, the function generator 52 outputs the motor displacement volume q=qmin.

As described above, by adopting the fourth embodiment in which the motor displacement volume q is controlled in correspondence to the deviation $\Delta N$ of the motor rotation rate N relative to the target rotation rate Na, it is possible to implement accurate control on the motor rotation rate N to set it equal to the target rotation rate Na. In addition, since the function generator 52 ensures that the motor displacement volume q is increased by a greater extent as the motor rotation rate difference $\Delta N$ becomes larger, the motor rotation rate N reaches a level close to the target rotation rate Na quickly.

It is to be noted that the present invention, which is characterized in that the brakes are engaged when an over rotation of the travel motion motor 12 occurs, may be realized in any of various modes other than those adopted in the embodiments explained above. While the hydraulic breaking force is increased by increasing the motor displacement volume q or increasing the relief pressures P15 and P16 at the relief valves 15 and 16 in the embodiments described above, a means for motor over rotation prevention other than these may be adopted. For instance, the breaking force may be increased as the service break is engaged or as the transmission 86 is forcibly switched to the low gear position. If there are at least three speed levels at the transmission, the gears may be shifted from a high gear to a medium gear and from the medium gear to a low gear.

While the travel motion control valve 11 is operated via the accelerator pedal 22a, the means for operation may be constituted by using a member other than the pedal member. In addition, while the rotation rate sensor 95 is used as the means for rotation rate detection so as to directly detect the motor rotation rate N, the motor rotation rate N may be detected indirectly based upon a physical quantity having a correlation with the motor rotation rate N. For instance, the motor rotation rate N may be indirectly detected in correspondence to the gear ratio at the transmission 86 and the vehicle speed. While the motor displacement volume is controlled with the regulator 14, the means for motor displacement volume control such as the regulator 14 does not need to be provided if the breaking force is increased through control other than motor displacement volume control.

The displacement volume q may also be changed gradually when the motor displacement volume q is decreased (the time point t2 in FIG. 5) as well as when the motor displacement volume q is increased (the time point t1 in FIG. 5). The pressure in the pipeline L20 may be gradually increased with a restrictor formed at the pipeline L20 as well so that the electromagnetic proportional valve 17 can be switched to on or off.

INDUSTRIAL APPLICABILITY

While an explanation is given above on an example in which the present invention is adopted in a wheel hydraulic excavator, the present invention may also be adopted in other types of work vehicles that are driven with a hydraulic motor 12, including wheel loaders and truck cranes. In addition, the present invention may be realized by using a so-called HST (hydrostatic transmission) hydraulic circuit achieved through a closed circuit connection of a hydraulic pump and a hydraulic motor, as long as the displacement volume control on the hydraulic motor is achieved based upon the drive pressure.

The disclosure of the following priority application is incorporated herein by reference.
Japanese Patent Application No. 2002-126313.

The invention claimed is:

1. A travel motion control apparatus for a hydraulically driven vehicle, comprising:
   a hydraulic pump that is driven by a driving motor;
   a travel motion motor that is driven with pressure oil supplied from the hydraulic pump;
   a displacement volume control device that controls a displacement volume of the travel motion motor so that the displacement volume decreases as a travel pressure of the travel motion motor decreases and the displacement volume increases as the travel pressure of the travel motion motor increases;
   a travel motion control valve that controls a flow rate of the pressure oil supplied from the hydraulic pump to the travel motion motor;
   an operation device with which the travel motion control valve is operated to generate the travel pressure according to a load in a pipeline from the travel motion control valve to the travel motion motor by the pressure oil output from the hydraulic pump, the travel pressure decreasing when the vehicle travels downhill;
   a rotation rate detection device that detects a rotation rate of the travel motion motor; and
   an over rotation prevention device that increases the displacement volume of the travel motion motor to a level equal to a predetermined value smaller than a maximum displacement volume if the rotation rate detection device detects a rotation rate equal to or higher than a predetermined rotation rate upper limit which is equal to or less than an allowable rotation rate limit of the travel motion motor, regardless of that the displacement volume control device controls the displacement volume of the travel motion motor so that the displacement volume decreases as the travel pressure generated by an operation of the operation device decreases.

2. A travel motion control apparatus for a hydraulically driven vehicle according to claim 1, wherein:
   if the rotation rate detection device detects a rotation rate equal to or higher than the rotation rate upper limit, the over rotation prevention device gradually increases the displacement volume of the travel motion motor.

3. A travel motion control apparatus for a hydraulically driven vehicle according to claim 1, wherein:
   the over rotation prevention device increases the displacement volume of the travel motion motor so that the displacement volume of the travel motion motor becomes 40% to 70% of a maximum displacement volume of the travel motion motor.

4. A hydraulically driven vehicle comprising a travel motion control apparatus according to claim 1.

5. A wheel hydraulic excavator comprising a travel motion control apparatus according to claim 1.

6. A travel motion control apparatus for a hydraulically driven vehicle, comprising:
   a hydraulic pump that is driven by a driving motor;
   a travel motion motor that is driven with pressure oil supplied from the hydraulic pump;
   a displacement volume control device that controls a displacement volume of the travel motion motor so that the displacement volume decreases as a travel pressure of the travel motion motor decreases and the displacement volume increases as the travel pressure of the travel motion motor increases;
   a travel motion control valve that controls a flow rate of the pressure oil supplied from the hydraulic pump to the travel motion motor;
   an operation device with which the travel motion control valve is operated to generate the travel pressure according to a load in a pipeline from the travel motion control valve to the travel motion motor by the pressure oil output from the hydraulic pump, the travel pressure decreasing when the vehicle travels downhill;
   a rotation rate detection device that detects a rotation rate of the travel motion motor; and
   an over rotation prevention device that increases the displacement volume of the travel motion motor if the rotation rate detection device detects a rotation rate equal to or higher than a predetermined rotation rate upper limit, regardless of that the displacement volume control device controls the displacement volume of the travel motion motor so that the displacement volume decreases as the travel pressure generated by an operation of the operation device decreases, wherein:
   the over rotation prevention device stops control for increasing the displacement volume of the travel motion motor once the rotation rate of the travel motion motor becomes equal to or less than a predetermined rotation rate lower limit which is at least lower than the rotation rate upper limit, and the displacement volume of the travel motion motor is controlled by the displacement volume control device in correspondence to the traveling pressure.

7. A travel motion control apparatus for a hydraulically driven vehicle according to claim 6, wherein:
   if the rotation rate detection device detects a rotation rate equal to or higher than the rotation rate upper limit, the over rotation prevention device gradually increases the displacement volume of the travel motion motor.

8. A travel motion control apparatus for a hydraulically driven vehicle according to claim 6, wherein:
   the over rotation prevention device increases the displacement volume of the travel motion motor so that the displacement volume of the travel motion motor becomes 40% to 70% of a maximum displacement volume of the travel motion motor.

9. A hydraulically driven vehicle comprising a travel motion control apparatus according to claim 6.

10. A wheel hydraulic excavator comprising a travel motion control apparatus according to claim 6.

11. A travel motion control apparatus for a hydraulically driven vehicle, comprising:
    a hydraulic pump that is driven by a driving motor and outputs hydraulic operating oil inside a tank;
    a travel motion motor that is driven with pressure oil supplied from the hydraulic pump;
    a displacement volume control device that controls a displacement volume of the travel motion motor so that the displacement volume decreases as a travel pressure of the travel motion motor decreases and the displacement volume increases as the travel pressure of the travel motion motor increases;
    a travel motion control valve that controls a flow rate of the pressure oil supplied from the hydraulic pump to the travel motion motor and includes a pressure oil supply port through which the pressure oil is supplied to the travel motion motor and a return port through which the pressure oil returns to the tank;

a counterbalance valve disposed between the travel motion motor and the travel motion control valve, which is controlled by a travel pressure output from the hydraulic pump;

an operation device with which the travel motion control valve is operated to generate the travel pressure according to a load in a pipeline from the travel motion control valve to the travel motion motor by the pressure oil output from the hydraulic pump, the travel pressure decreasing when the vehicle travels downhill;

a rotation rate detection device that detects a rotation rate of the travel motion motor; and an over rotation prevention device that reduces a rotation rate of the travel motion motor if the rotation rate detection device detects a rotation rate equal to or higher than a predetermined rotation rate upper limit, regardless of that the displacement volume control device controls the displacement volume of the travel motion motor so that the displacement volume decreases as the travel pressure generated by an operation of the operation device decreases, wherein the rotation rate upper limit assumes a value equal to or smaller than an allowable rotation rate limit of the travel motion motor; and the over rotation prevention device increases the displacement volume of the travel motion motor to a predetermined value smaller than a maximum displacement volume if the rotation rate detection device detects a rotation rate equal to or higher than the rotation rate upper limit.

12. A travel motion control apparatus for a hydraulically driven vehicle according to claim 11, wherein:

if the rotation rate detection device detects a rotation rate equal to or higher than the rotation rate upper limit, the over rotation prevention device gradually increases the displacement volume of the travel motion motor.

13. A travel motion control apparatus for a hydraulically driven vehicle according to claim 11, wherein:

the over rotation prevention device increases the displacement volume of the travel motion motor so that the displacement volume of the travel motion motor becomes 40% to 70% of a maximum displacement volume of the travel motion motor.

14. A hydraulically driven vehicle comprising a travel motion control apparatus according to claim 11.

15. A wheel hydraulic excavator comprising a travel motion control apparatus according to claim 11.

16. A travel motion control apparatus for a hydraulically driven vehicle, comprising:

a hydraulic pump that is driven by a driving motor and outputs hydraulic operating oil inside a tank:

a travel motion motor that is driven with pressure oil supplied from the hydraulic pump;

a displacement volume control device that controls a displacement volume of the travel motion motor so that the displacement volume decreases as a travel pressure of the travel motion motor decreases and the displacement volume increases as the travel pressure of the travel motion motor increases;

a travel motion control valve that controls a flow rate of the pressure oil supplied from the hydraulic pump to the travel motion motor and includes a pressure oil supply port through which the pressure oil is supplied to the travel motion motor and a return port through which the pressure oil returns to the tank;

a counterbalance valve disposed between the travel motion motor and the travel motion control valve, which is controlled by a travel pressure output from the hydraulic pump;

an operation device with which the travel motion control valve is operated to generate the travel pressure in a pipeline from the travel motion control valve to the travel motion motor by the pressure oil output from the hydraulic pump, the travel pressure decreasing according to a load when the vehicle travels downhill;

a rotation rate detection device that detects a rotation rate of the travel motion motor; and an over rotation prevention device that reduces a rotation rate of the travel motion motor if the rotation rate detection device detects a rotation rate equal to or higher than a predetermined rotation rate upper limit, regardless of that the displacement volume control device controls the displacement volume of the travel motion motor so that the displacement volume decreases as the travel pressure generated by an operation of the operation device decreases, wherein the over rotation prevention device increases the displacement volume of the travel motion motor regardless of motor displacement volume control executed by the displacement volume control device if the rotation rate detection device detects a rotation rate equal to or higher than the rotation rate upper limit; and control for increasing the displacement volume of the travel motion motor is stopped once the rotation rate of the travel motion motor becomes equal to or less than a predetermined rotation rate lower limit which is at least lower than the rotation rate upper limit and the displacement volume of the travel motion motor is controlled by the displacement volume control device in correspondence to the traveling pressure.

17. A travel motion control apparatus for a hydraulically driven vehicle according to claim 16, wherein:

if the rotation rate detection device detects a rotation rate equal to or higher than the rotation rate upper limit, the over rotation prevention device gradually increases the displacement volume of the travel motion motor.

18. A travel motion control apparatus for a hydraulically driven vehicle according to claim 16, wherein:

the over rotation prevention device increases the displacement volume of the travel motion motor so that the displacement volume of the travel motion motor becomes 40% to 70% of a maximum displacement volume of the travel motion motor.

19. A hydraulically driven vehicle comprising a travel motion control apparatus according to claim 16.

20. A wheel hydraulic excavator comprising a travel motion control apparatus according to claim 16.

* * * * *